(12) United States Patent
Lin et al.

(10) Patent No.: US 11,046,404 B2
(45) Date of Patent: Jun. 29, 2021

(54) DUAL PROPELLER DRIVE SYSTEM FOR A SHIP

(71) Applicant: ABB Schweiz AG, Baden (CH)

(72) Inventors: Chenjie Lin, Fuquay Varina, NC (US);
Colin E Tschida, Durham, NC (US);
Ghanshyam Shrestha, Cary, NC (US);
Steven Englebretson, Raleigh, NC (US)

(73) Assignee: ABB Schweiz AG, Baden (CH)

(*) Notice: Subject to any disclaimer, the term of this patent is extended or adjusted under 35 U.S.C. 154(b) by 44 days.

(21) Appl. No.: 16/527,465

(22) Filed: Jul. 31, 2019

(65) Prior Publication Data

US 2021/0031892 A1 Feb. 4, 2021

(51) Int. Cl.
*B63H 5/10* (2006.01)
*H02K 16/02* (2006.01)
*H02K 49/10* (2006.01)

(52) U.S. Cl.
CPC ............ *B63H 5/10* (2013.01); *H02K 16/02* (2013.01); *B63H 2005/103* (2013.01); *B63H 2005/106* (2013.01); *H02K 49/10* (2013.01)

(58) Field of Classification Search
CPC ........ H02K 16/02; H02K 16/00; H02K 16/05; B63H 5/10; B63H 2005/103; B63H 2005/106; B63H 2005/1258
See application file for complete search history.

(56) References Cited

U.S. PATENT DOCUMENTS

| | | | | |
|---|---|---|---|---|
| 1,690,953 A | * | 11/1928 | Ludwig | H02K 17/04 318/769 |
| 3,898,490 A | * | 8/1975 | Wedman | H02K 55/00 310/52 |
| 4,532,447 A | * | 7/1985 | Cibie | H02K 51/00 310/114 |
| 5,599,215 A | * | 2/1997 | Jarvinen | B63H 5/10 440/6 |

(Continued)

FOREIGN PATENT DOCUMENTS

| | | | | | |
|---|---|---|---|---|---|
| JP | 63-217968 | | * | 9/1988 | ............... B63H 5/10 |
| JP | 2009113578 | A | * | 5/2009 | ............... B63H 5/10 |
| WO | 2016086874 | | * | 6/2016 | ............ H02K 16/02 |

OTHER PUBLICATIONS

C. Chryssostomidis, J. L. Kirtley Jr., A. Slocum, J. Chalfant, S.D. Sudhoff, S.D. Pekarek, "Integrated Contra-Rotating Propulsion Drives for Thrust-Dense Propulsion Systems", 8 Pages.

(Continued)

*Primary Examiner* — Burton S Mullins
(74) *Attorney, Agent, or Firm* — Taft Stettinius & HollisterLLP

(57) ABSTRACT

A drive system is provided for propelling a ship through water. The drive system has two propellers. The propellers are coaxial so that one propeller engages the incoming water first, and the other propeller engages the water after it passes through the first propeller. The drive system has a stator that causes a first rotor to rotate. The first rotor is connected to, the first propeller to cause the first propeller to rotate. The first rotor also causes a second rotor to rotate. The second rotor is connected to the second propeller to cause the second propeller to rotate.

20 Claims, 3 Drawing Sheets

(56) References Cited

U.S. PATENT DOCUMENTS

| | | | | |
|---|---|---|---|---|
| 6,121,705 | A * | 9/2000 | Hoong | H02K 16/02 310/103 |
| 6,297,575 | B1 * | 10/2001 | Yang | H02K 51/00 290/6 |
| 7,018,249 | B2 * | 3/2006 | Ries | F01P 3/12 440/6 |
| 7,026,738 | B1 * | 4/2006 | Lynch | B63H 5/10 310/114 |
| 7,029,339 | B2 * | 4/2006 | Brach | H02K 1/185 440/6 |
| 7,791,235 | B2 | 9/2010 | Kern et al. | |
| 7,956,504 | B2 * | 6/2011 | Quere | H02K 7/116 310/114 |
| 7,982,351 | B2 * | 7/2011 | Atallah | H02K 11/048 310/114 |
| 8,459,950 | B2 | 6/2013 | Shuto et al. | |
| 8,464,511 | B1 * | 6/2013 | Ribarov | H02K 7/14 60/226.1 |
| 8,624,415 | B2 * | 1/2014 | Koenig | F02K 3/06 290/52 |
| 8,968,042 | B2 * | 3/2015 | Calverley | B63H 23/24 440/6 |
| 9,018,863 | B2 * | 4/2015 | Hoeijmakers | B60K 6/448 318/79 |
| 9,184,649 | B2 * | 11/2015 | Webster | H02K 51/00 |
| 9,190,892 | B2 | 11/2015 | Anthony | |
| 10,637,326 | B2 * | 4/2020 | Chong | H02K 1/2706 |
| 2001/0051475 | A1 * | 12/2001 | Reuter | B63H 23/24 440/66 |
| 2007/0290563 | A1 * | 12/2007 | Zhao | H02K 51/00 310/114 |
| 2008/0089786 | A1 | 4/2008 | Sinreich | |
| 2011/0115326 | A1 * | 5/2011 | Clark | H02K 7/11 310/114 |
| 2013/0181562 | A1 * | 7/2013 | Gieras | H02K 16/02 310/114 |
| 2020/0231275 | A1 * | 7/2020 | Groman | F04D 25/06 |

OTHER PUBLICATIONS

Abb Industry Oy, Marine Group, "The CRP Azipod Propulsion Concept", 2001, 16 Pages. Helsinki, Finland.

* cited by examiner

DUAL PROPELLER DRIVE SYSTEM FOR A SHIP

BACKGROUND

The present inventions relate generally to ships that travel through water, and more particularly, to a propulsion system for a ship that uses two propellers.

Ships are used throughout the world for many purposes. As is well-recognized, ships have a hull that keeps out water from the interior of the ship and permits the ship to float. Some type of propulsion system is also needed to drive the ship through the water. Commonly, the propulsion system includes one or more propellers in the water that are rotated to push or pull the ship.

It has been found that ship propulsion systems that employ two adjacent propellers can be more efficient than a single propeller. A dual propeller system has two propellers that rotate about the same axis. One propeller is located upstream and is the first propeller to engage and drive the water flow. The other propeller is located downstream of the first propeller and drives the water flow after it passes through the first propeller.

Dual propeller drive systems can offer improved efficiencies of 5-15% compared to single propeller drive systems. That is, in order to produce an equivalent amount of thrust to drive the ship, a dual propeller system may require 5-15% less fuel to drive the propellers. This is particularly significant in the case of large freight ships (e.g., container or tanker ships) or large passenger ships (e.g., cruise ships).

Although dual propeller propulsion systems currently exist, for ships, existing drive systems have a number of disadvantages. For example, in the case of mechanical geared systems, such systems suffer from wear and reliability issues and can be complicated structures. In the case of electrically driven systems, it can be difficult to supply electrical power to the various components and slip rings may be needed, which adds complexity and another potential wear component.

Therefore, improved dual propeller drive systems for ships would be desirable.

SUMMARY

A drive system is described for the propellers of a ship. The drive system has two adjacent, coaxial propellers. In order to rotate the propellers, the drive system has a stator and two rotors. One propeller is connected to one of the rotors, and the other propeller is connected to the other rotor. The stator generates a rotating magnetic field which causes the first rotor to rotate and drive the first propeller. The first rotor also produces a second rotating magnetic field which causes the second rotor to rotate and drive the second propeller.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
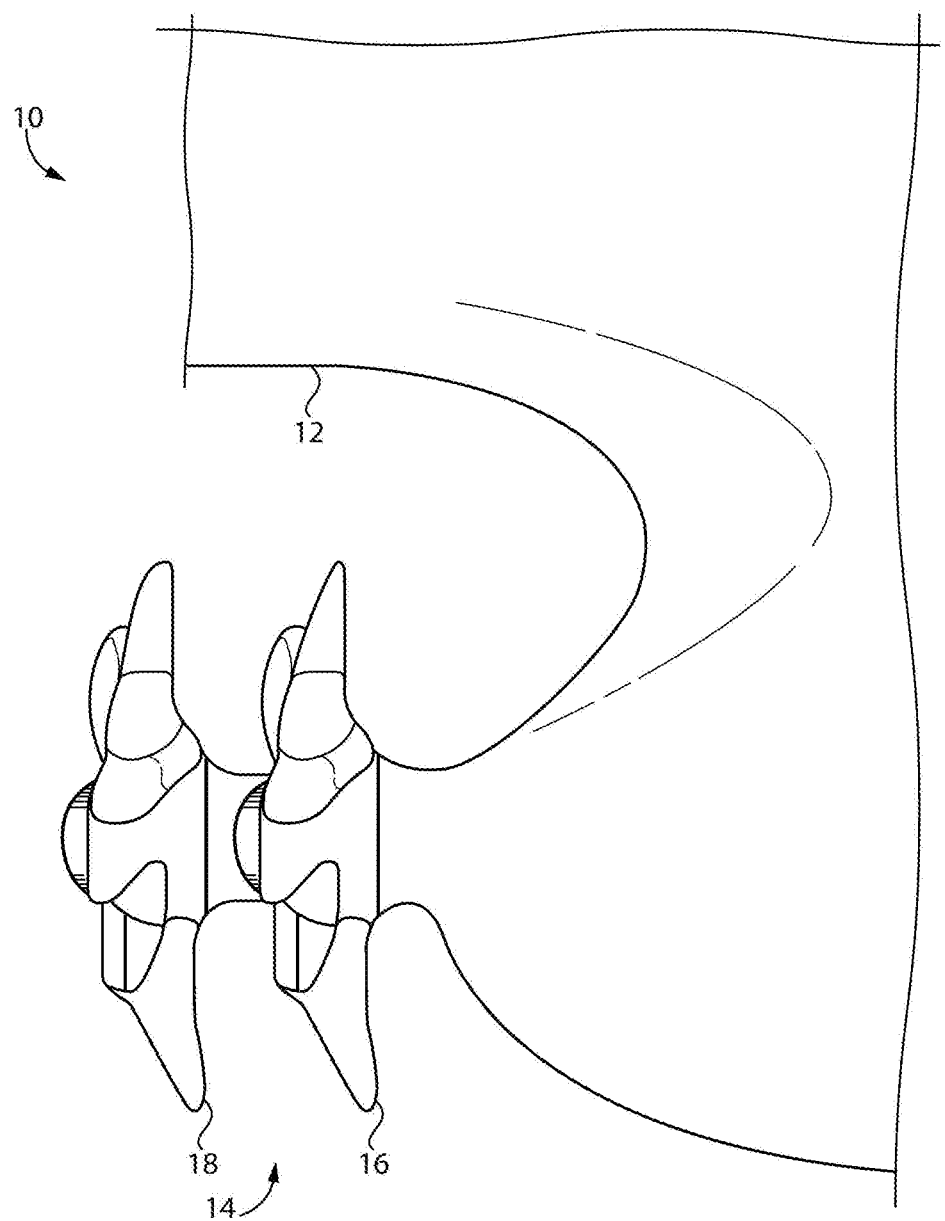
FIG. 1 is a side view of a dual propeller for a ship.

Referring now to the figures, and particularly FIG. 1, the lower portion of the hull 12 of a ship 10 is shown with a dual propeller drive system 14. As is understood, the illustrated portion of the hull 12 would be under water so that the propellers 16, 18 are within the water and can drive the ship 10 in a forward or reverse direction as the propellers 16, 18 are rotated. As described below, and illustrated in FIG. 3, the propellers 16, 18 are connected to the hull 12 through a drive system 14. Thus, the propellers 16, 18 are longitudinally attached to the hull 12 but are able to rotate relative to the hull 12 in response to drive torques supplied to the propellers 16, 18 by the drive system 14.

As shown in FIG. 1, the propulsion system 14 described herein has two propellers 16, 18 that rotate about a common axis. The first propeller 16 is the first to engage the incoming water flow and produces axial thrust to move the ship 10 by rotating through the water and pushing/pulling the water through and past the propellers 16. The second propeller 18 is axially adjacent the first propeller 16 and receives the water flow after it has passed through the first propeller 16. In like fashion, the second propeller 18 rotates to produce thrust by pushing/pulling the water through and past the second propeller 18. It is understood that the first and second propellers 16, 18 are labeled in FIG. 1 only for illustration and the first and second propellers 16, 18 could be reversed in order depending on whether the propellers 16, 18 are pushing or pulling the hull 12 through the water and depending on the configuration of the drive system 14.

Preferably, the first and second propellers 16, 18 rotate in opposite directions relative to each other in a contra-rotating manner. Thus, the first propeller 16 produces an outgoing flow of water that is moving rearward toward the second propeller 18 and is also moving circularly in the same rotational direction as the first propeller 16. The second propeller 18 receives this water flow and imparts additional rearward movement to the water flow but imparts an opposite circular motion to the water flow. Where the rotational speed of the first and second propellers 16, 18 is the same as each other, the rotary motion imparted to the water by the two propellers 16, 18 is mostly cancelled out by the opposite but equal spins. Although the preferred embodiment has propellers 16, 18 that rotate in opposite directions at equal speeds, it is understood that other designs may also be used, for example, with propellers 16, 18 rotating in the same direction and/or at different speeds.

Figure 2:
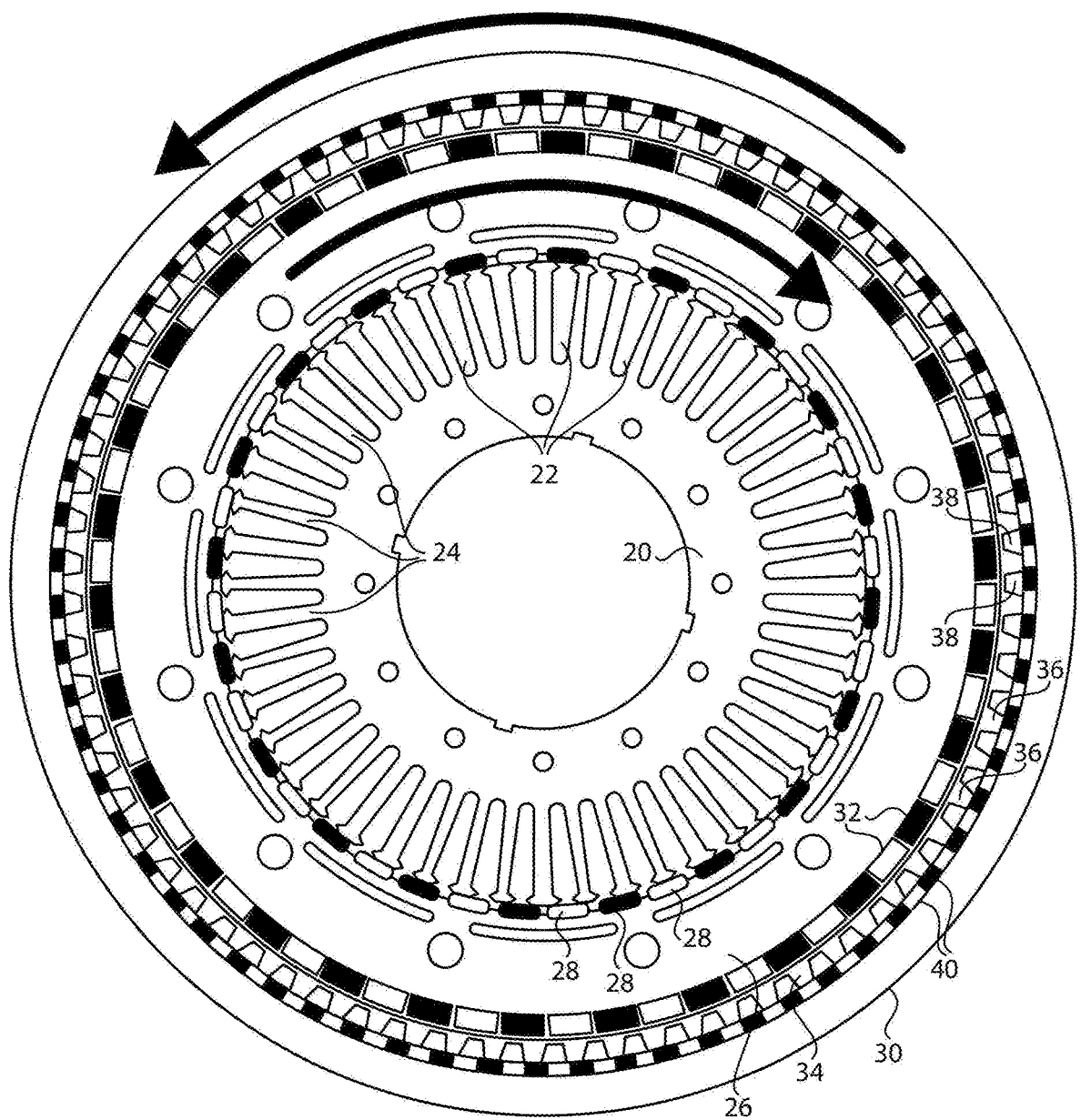
FIG. 2 is a transverse cross-sectional view of one embodiment of a drive system for the dual propeller.

Turning to FIG. 2, a drive system 14 is shown for a dual propeller system 14. The drive system 14 has a stator 20 that is fixed to the hull 12 of the ship 10 in a non-rotatable manner such that the stator 20 does not rotate. The stator 20 includes electrical windings 22 that run through gaps 22 between adjacent poles 24. In operation, electric current flows through the windings 22 to generate a magnetic field that rotates around the stator 20. The electric current is provided by a power supply onboard the ship 10 such as a fuel powered generator. Because the magnetic field must be actively generated (i.e., does not exist without the active step of supplying electric power to the windings 22), the magnetic field of the stator 20 may be considered to be an active field.

Figure 3:
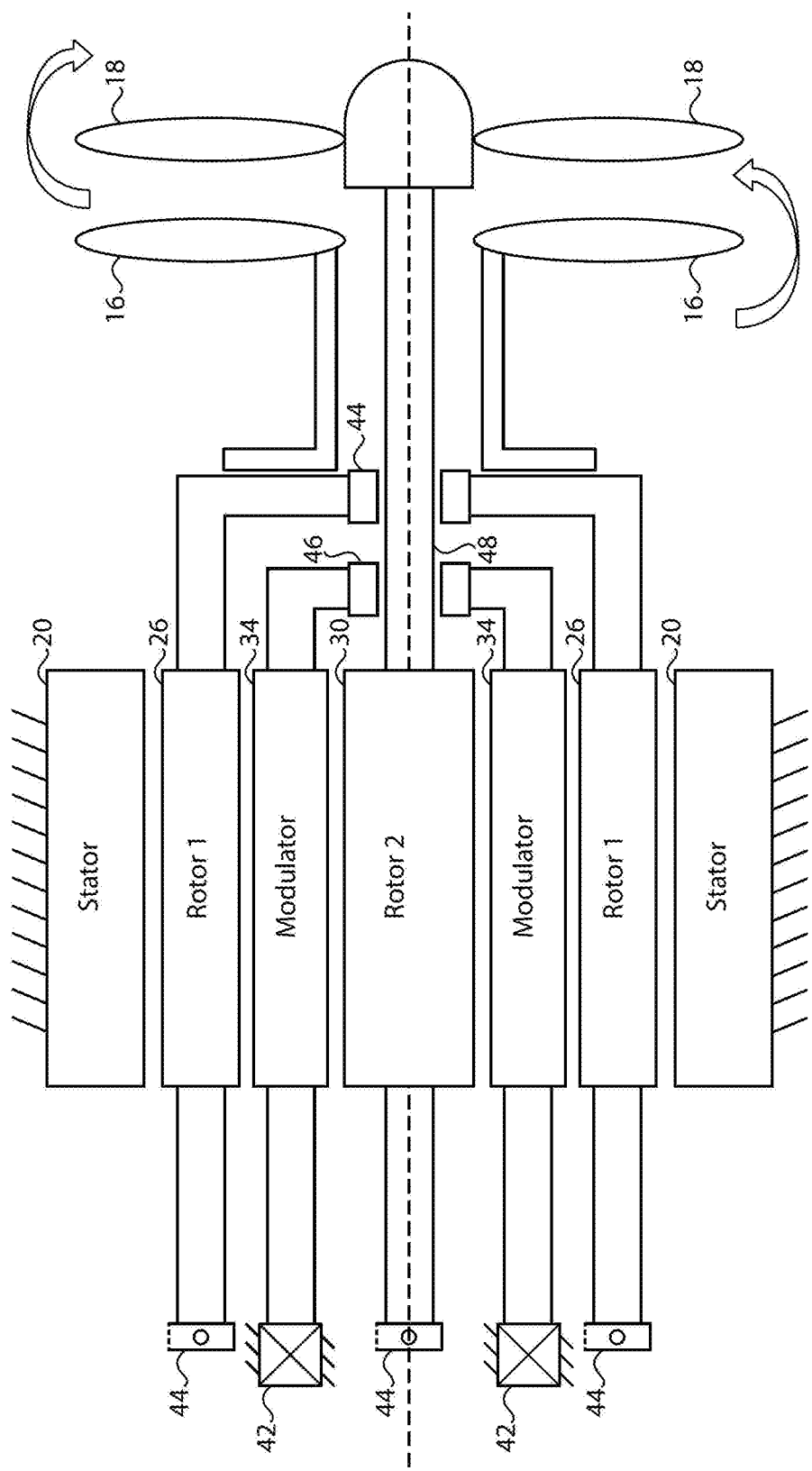
FIG. 3 is a longitudinal cross-sectional view of another embodiment of a drive system for the dual propeller.

Surrounding the stator 20 is a first rotor 26 that rotates in response to the rotating magnetic field of the stator 20. In this fashion, the stator 20 and the first rotor 26 may be considered to be a conventional electric motor. Although various types of rotor designs may be used that result in rotation in response to a rotating magnetic field, the preferred embodiment includes permanent magnets 28 (i.e., third permanent magnets 28) in the first rotor 26 that are attracted to and repelled by the rotating magnetic field to cause the first rotor 26 to rotate. As illustrated in FIG. 3, the first rotor 26 is connected to the first propeller 16 and causes the first propeller 16 to rotate as the first rotor 26 rotates. Preferably, the first propeller 16 is fixedly attached to the first rotor 26 such that the first propeller 16 rotates at the same speed as the first rotor 26.

The second propeller 18 is connected to a second rotor 30, which in the embodiment of FIG. 2 surrounds the first rotor 26. Like the first propeller 16 and first rotor 26, it may be preferable for the second propeller 18 to be fixedly attached to the second rotor 30 such that the second propeller 18 rotates at the same speed as the second rotor 30. Like the first rotor 26, the second rotor 30 is rotatable relative to the hull 12 in order to drive the second propeller 18. The second rotor 30 is rotatably driven by a second rotating magnetic field that is produced by the first rotor 26. The second rotating magnetic field is produced by the first rotor 26 as the first rotor 26 rotates.

In order to produce the second rotating magnetic field, the first rotor 26 is preferably provided with a group of permanent magnets 32 (i.e., first permanent magnets 32). If permanent magnets 28 are used to drive the first rotor 26 in response to the rotating magnetic field of the stator 20 as described above, it may be that the first rotor 26 can include two separate sets of permanent magnets 28, 32. That is, in the embodiment of FIG. 2, one set of permanent magnets 28 may be arranged on the inside of the first rotor 26 to engage with the magnetic field of the stator 20 and thereby cause rotation of the first rotor 26. Another set of permanent magnets 32 may also be arranged on the outside of the first rotor 26 to produce a second magnetic field that engages with the second rotor 30 to thereby cause rotation of the second rotor 30. In other words, the third magnets 28 face the stator 20 and the first magnets 32 face the second rotor 30. Because the second magnetic field is produced by the permanent magnets 32 without any active step of supplying power to generate the magnetic field, the second magnetic field may be considered to be a passive field. As described above, it may be preferable for the first and second propellers 16, 18 to rotate in opposite directions at the same speed. Thus, where the first and second propellers 16, 18 are fixedly attached to the first and second rotors 26, 30, respectively, it is preferred for the first and second rotors 26, 30 to rotate in opposite directions relative to each other and at the same speed.

It may also be preferable for a modulator 34 to be located between the first and second rotors 26, 30 to modulate the second magnetic field. The interaction between the first rotor 26, modulator 34 and second rotor 30 may be considered to be a type of magnetic gear. The modulator 34 may include a series of magnetic segments 36 (e.g., a soft magnetic material), like bars, spaced around the rotors 26, 30 with adjacent magnetic segments 36 being separated from each other by non-magnetic segments 38. For example, the magnetic segments 36 may be made from steel and the non-magnetic segments 38 may be made of plastic. The magnetic and non-magnetic segments 36, 38 are preferably interconnected together to form a unitary ring between the first and second rotors 26, 30. For example, the magnetic segments 36 could be partially embedded within plastic which fills the gaps between the magnetic segments 36 to form the non-magnetic segments 38 and hold the magnetic segments 36 together in a ring.

The modulator 34 magnetically transmits torque from the first rotor 26 to the second rotor 30. Thus, torque to drive the propellers 16, 18 is transmitted first from the stator 20 to the first rotor 26, which drives the first propeller 16. A remainder torque is then transmitted from the first rotor 26 to the second rotor 30 through the modulator 34 to drive the second propeller 18. Preferably, the modulator 34 is not physically engaged with either the first or second rotor 26, 30. That is, annular gaps exist between the modulator 34 and the first and second rotors 26, 30 so that no physical driving or wear occurs therebetween.

In use, the magnetic segments 36 and non-magnetic segments 38 of the modulator 34 alter the second rotating magnetic field that is produced by the first permanent magnets 32 of the first rotor 30. The altered rotating magnetic field may then engage with, a set of permanent magnets 40 (i.e., second permanent magnets 40) on the inside of the second rotor 30 (i.e., facing the first rotor 26). Thus, the first permanent magnets 32 of the first rotor 26 drive the second permanent magnets 40 of the second rotor 30 through the modulator 34. As described above, it is preferable for the second rotating magnetic field to drive the second rotor 30 in an opposite direction as the first rotor 26. This may be achieved through the use of the modulator 34. Although it is possible in some embodiments for the modulator 34 to rotate between the rotors 26, 30, the modulator 34 is preferably non-rotatably fixed 42 to the hull 12 as shown in FIG. 3. Thus, as shown, the first and second rotors 26, 30 may be mounted on bearings 44 to allow the rotors 26, 30 to rotate. However, the modulator 34 is fixed 42 on at least the inboard side to prevent the modulator 34 from rotating. Likewise, it is understood that the stator 20 is also fixed and does not rotate. While the embodiment of FIG. 3 does illustrate a bearing 46 on the outboard side of the modulator 34, this bearing 46 is designed to provide lateral support for the modulator 34 against the driveshaft 48 (which, is rotating) for the second propeller 18. In order to achieve opposite rotation and equal speed of the rotors 26, 30 and propellers 16, 18, it is also preferred for the magnetic pole pairs of the first set of permanent magnets 32 and second set of permanent magnets 40 to be as close to 1:1 as possible. However, it is understood that in most embodiments it will not be possible to achieve a ratio of exactly 1:1 for the first and second magnets 32, 40, and yet, the speed of the rotors 26, 30 and propellers 16, 18 may still be considered to be the same. Nevertheless, a ratio of magnetic pole pairs for the first and second magnets 32, 40 is preferably between 0.8 and 1.25.

Where permanent magnets are used for the first, second and third sets of magnets 32, 40, 28, it may be possible for the first and second permanent magnets 32, 40 to be lower powered and less costly magnets than the third permanent magnets 28. In particular, in the torque transmission arrangement of the drive system 14, all of the produced torque is initially transmitted from the stator 20 to the first rotor 26 through the first set of permanent magnets 28. Thus, it is preferable for the third magnets 28 to be high power magnets. However, half of the torque is then transmitted to the first propeller 16 to drive the ship 10 through the water. As a result, only half of the originally produced torque is transmitted from the first rotor 26 to the second rotor 30 through the first and second sets of permanent magnets 32, 40. Therefore, it is possible that the first and second magnets 32, 40 may be less powerful than the third magnets 28. This may make it possible to achieve cost savings by using non-rare earth magnets, like ferrite magnets, for the first and second magnets 32, 40 and only using rare earth magnets for the third magnets 28.

While the embodiment of FIG. 2 utilizes an inner stator 20 and first and second rotors 26, 30 that surround the stator 20 in respective order, FIG. 3 illustrates the reverse arrangement. In this arrangement, the second rotor 30 is located in the center of the assembly, and the first rotor 26 surrounds the second rotor 30 and the stator 20 surrounds the first rotor 26. It is understood, that the arrangement of magnets 28, 32, 40 will also be reversed in this embodiment. This arrangement may be advantageous for several reasons. For example, as noted, windings 22 need to be routed through the stator 20, and the windings 22 will need to be connected to a power supply. Accomplishing the electrical connections with an inner stator 20 like FIG. 2 may be more challenging due to the rotating components (i.e., first and second rotors 26, 30) surrounding the stator 20, which may require special passageways to be formed in the supporting structure to access the windings 27. However, in FIG. 3, the electrical connections may be made directly without needing to route such connections through or around rotating components. Also, the stator 20 produces significant heat during use due to the electrification of the windings 22 to generate the first rotating magnetic field. However, cooling of the stator 20 may be easier in this embodiment since the stator 20 is on the outside and may be cooled by a relatively simple system such as a fan.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A ship, comprising:
a hull;
a stator non-rotatably fixed to the hull, the stator comprising electrical windings conducting electrical current and generating a first rotating magnetic field;
a first rotor rotatably connected to the hull, the first rotor being rotatably driven by the first rotating magnetic field of the stator, the first rotor comprising a plurality of first permanent magnets spaced thereabout producing a second rotating magnetic field as the first rotor rotates; a second rotor rotatably connected to the hull, the second rotor being rotatably driven by the second rotating magnetic field of the first rotor;
a first propeller connected to the first rotor and being rotatably driven thereby to drive the hull through water; and
a second propeller connected to the second rotor and being rotatably driven thereby to drive the hull through the water.

2. A ship, comprising:
a hull;
a stator non-rotatably fixed to the hull, the stator comprising electrical windings conducting electrical current and generating a first rotating magnetic field;
a first rotor rotatably connected to the hull, the first rotor being rotatably driven by the first rotating magnetic field of the stator, the first rotor producing a second rotating magnetic field as the first rotor rotates;
a second rotor rotatably connected to the hull, the second rotor being rotatably driven by the second rotating magnetic field of the first rotor;
a modulator between the first and second rotors, the modulator magnetically transmitting torque from the first rotor to the second rotor;
a first propeller connected to the first rotor and being rotatably driven thereby to drive the hull through water; and
a second propeller connected to the second rotor and being rotatably driven thereby to drive the hull through the water.

3. The ship according to claim 2, wherein the first and second propellers rotate in opposite directions.

4. The ship according to claim 3, wherein the first and second propellers rotate at the same speed.

5. The ship according to claim 2, wherein the first and second rotors rotate in opposite directions.

6. The ship according to claim 5, wherein the first and second rotors rotate at the same speed.

7. The ship according to claim 2, wherein the first propeller is fixedly attached to the first rotor and the second propeller is fixedly attached to the second rotor.

8. The ship according to claim 2, wherein the modulator is non-rotatably fixed to the hull.

9. The ship according to claim 2, wherein the modulator is not physically engaged with the first rotor or the second rotor.

10. The ship according to claim 2, wherein the first rotating magnetic field is an active field and the second rotating magnetic field is a passive field.

11. The ship according to claim 2, wherein the first rotor comprises a plurality of first permanent magnets spaced thereabout producing the second rotating magnetic field.

12. The ship according to claim 11, wherein the modulator comprises a plurality of magnetic segments separated by non-magnetic segments, the modulator producing an altered rotating magnetic field from the second rotating magnetic field, the second rotor comprising a plurality of second permanent magnets spaced thereabout, and the plurality of second permanent magnets being rotatably driven by the altered rotating magnetic field to rotate the second rotor.

13. The ship according to claim 12, wherein a ratio between magnetic pole pairs of the first plurality of permanent magnets and magnetic pole pairs of the second plurality of permanent magnets is between 0.8 and 1.25.

14. The ship according to claim 12, wherein the first rotor comprises a plurality of third permanent magnets spaced thereabout being rotatably driven by the first rotating magnetic field to rotate the first rotor.

15. The ship according to claim 14, wherein the plurality of third permanent magnets are rare earth magnets and the pluralities of first and second permanent magnets are non-rare earth magnets.

16. The ship according to claim 2, wherein the first rotor surrounds the stator and the second rotor surrounds the first rotor.

17. The ship according to claim 2, wherein the stator surrounds the first rotor and the first rotor surrounds the second rotor.

18. The ship according to claim 2, wherein the first and second propellers rotate in opposite directions, the first and second rotors rotate in opposite directions, the first propeller is fixedly attached to the first rotor and the second propeller is fixedly attached to the second rotor, and the first rotating magnetic field is an active field and the second rotating magnetic field is a passive field.

19. The ship according to claim 18, wherein the modulator is non-rotatably fixed to the hull, and the modulator is not physically engaged with the first rotor or the second rotor.

20. The ship according to claim 19, wherein the first rotor comprises a plurality of first permanent magnets spaced thereabout producing the second rotating magnetic field, the modulator comprises a plurality of magnetic segments separated by non-magnetic segments, the modulator producing an altered rotating magnetic field from the second rotating magnetic field, the second rotor comprising a plurality of second permanent magnets spaced thereabout, and the plurality of second permanent magnets being rotatably driven by the altered rotating magnetic field to rotate the second rotor, and the first rotor comprises a plurality of third permanent magnets spaced thereabout being rotatably driven by the first rotating magnetic field to rotate the first rotor.

* * * * *